US005600841A

United States Patent [19]
Culbert

[11] Patent Number: 5,600,841
[45] Date of Patent: Feb. 4, 1997

[54] METHOD AND APPARATUS FOR ANTICIPATORY POWER MANAGEMENT FOR LOW POWER DATA

[75] Inventor: Michael F. Culbert, San Jose, Calif.

[73] Assignee: Apple Computer, Inc., Cupertino, Calif.

[21] Appl. No.: 639,946

[22] Filed: Apr. 18, 1996

Related U.S. Application Data

[63] Continuation of Ser. No. 316,234, Sep. 30, 1994, abandoned.

[51] Int. Cl.$^6$ .................................................. G06F 1/30
[52] U.S. Cl. ................ 395/750; 395/182.12; 395/183.12
[58] Field of Search ........................ 395/750, 181–185.1; 364/707

[56] References Cited

U.S. PATENT DOCUMENTS

| | | | |
|---|---|---|---|
| 4,611,289 | 9/1986 | Coppola | 364/492 |
| 4,868,832 | 9/1989 | Marrington et al. | 395/750 |
| 5,230,074 | 7/1993 | Canova, Jr. et al. | 395/750 |
| 5,315,161 | 5/1994 | Robinson et al. | 307/66 |
| 5,317,752 | 5/1994 | Jewett et al. | 395/750 |
| 5,388,265 | 2/1995 | Volk | 395/750 |
| 5,423,045 | 6/1995 | Kannan et al. | 395/750 |

FOREIGN PATENT DOCUMENTS

| | | |
|---|---|---|
| 0317072 | 5/1989 | European Pat. Off. . |
| 6102971 | 4/1994 | European Pat. Off. . |

OTHER PUBLICATIONS

IBM Technical Disclosure Bulletin, May 1985, vol. 27, pp. 6862–6863.

*Primary Examiner*—Jack B. Harvey
*Assistant Examiner*—Sumati Lefkowitz
*Attorney, Agent, or Firm*—Hickman Beyer & Weaver

[57] ABSTRACT

A method, system, and apparatus for controlling the supply of power to an I/O device attached to a General Purpose Input/Output (GPIO) circuit in a personal digital assistant (PDA) is described. The GPIO circuit, which is responsible for supplying power to the attached I/O device, includes a pin enable circuit coupled to the power pin of the I/O device, where the pin enable circuit includes a contingency register holding a contingency bit and a power register which controls the power supply to the I/O device power pin. The contingency bit is reflective of a power supply priority of the I/O device, where the priority is determined by the type of the I/O device and whether or not the I/O device is recognized. In the event of an unanticipated system powerdown or a power failure, the contents of the power register are replaced with the contingency bit to control the power supply to the I/O device according to the power supply priority specified by the contingency bit, so that unrecognized devices do not receive power during and after the power failure. This is done since unrecognized devices are likely the cause of power failures by demanding more current than the system can provide.

31 Claims, 7 Drawing Sheets

METHOD AND APPARATUS FOR ANTICIPATORY POWER MANAGEMENT FOR LOW POWER DATA

This is a continuation, of application Ser. No. 08/316,234 filed Sep. 30, 1994 now abandoned.

BACKGROUND OF THE INVENTION

1. Field of the Invention

The present invention relates to devices and methods for power control in electronic devices. More specifically, the present invention includes a method and apparatus for controlling power battery powered electronic devices.

2. The Relevant Art

Personal computing has undergone a revolution over the past decade. The steady increase in the computing power of microchips, coupled with advances in the miniaturization of electronics and the development of strong, lightweight materials and batteries, has fostered the creation of a large market in ever smaller computing devices. Such computing devices include notebook computers, such as Apple Computer, Incorporated's PowerBook™ and Duo™ notebook computers, which are lightweight and offer the computing power of desktop computers. Smaller still are the relatively new hand held computing devices, otherwise known as personal digital assistants, or PDAs. These devices are exemplified by the Apple Newton™ PDA and the Sharp Wizard PDA, both of which offer users the ability to enter information electronically by writing on an electronic tablet using a stylus. Such devices have become popular replacements for traditional personal organizers such as date books and note pads.

One difficulty with developing small computing devices arises from the limitations of battery technology. Although batteries are available which are both lightweight and powerful, their lifetimes are on the order of hours imposing undesirable limits on the usefulness of notebook computers and PDAs. Thus, designers are challenged to develop small computing devices which draw battery current as efficiently as possible to extend their utility. One approach to this problem has been to minimize power intensive Central Processor Unit (CPU) operations by the inclusion of Application-Specific Integrated Circuits (ASICs) which handle many tasks that otherwise would use CPU time in an energy inefficient manner, and the design of systems which only require the CPU to operate when absolutely necessary. The latter approach is described in co-pending U.S. Patent application Ser. No. 08/316,040, filed concurrently herewith and which is incorporated herein by reference. This is especially difficult in low power systems such as PDSs as there are many sources of power failure and power-off conditions that cannot always be handled by software.

One particularly troublesome source of battery drain is related to the General Purpose Input/Output (GPIO) circuits which reside on the ASIC and which circuits control the power allocation to various internal and external devices which interface with the ASIC. Such devices include the display screen, the tablet (in the case of a stylus-based system such as the Newton™ PDA), and Personal Computer Memory Card Industry Association (PCMCIA) cards which add a variety of functionalities to computers such as additional memory and modem capability. Power loss related to PCMCIA cards can be especially difficult to control in situations wherein a user attempts to install a PCMCIA card that draws too much current from the system, forcing an unanticipated powerdown. Present system designs do not provide a mechanism to advise the user that the offending card cannot be accommodated under the present system conditions and/or ensure that functionalities which should remain powered, e.g., PCMCIA cards maintaining a communications link with a remote source, remain powered. Thus, under the limitations of present GPIO design, the user is vulnerable to system failure caused by a PCMCIA card or other device which causes an unanticipated system powerdown, i.e., a powerdown in response to an event which causes an error state in the system for which no software "trap" is available, resulting from the device demanding too much current from the system. In addition, present GPIO designs tend to "leak" current to ground, a condition which can be ill afforded in PDAs having limited battery life. Thus, there is a need for more "intelligent" power management of GPIOs, especially under error conditions.

SUMMARY OF THE INVENTION

The present invention reduces undesired current leaks using an anticipatory power management method and system to control sources of current loss related to I/O circuits, especially GPIOs. In one preferred embodiment, the present invention includes a method for controlling power to an I/O device attached to an I/O circuit, which method comprises the steps of (a) providing an I/O circuit including a pin enable comprising a contingency register holding a contingency bit and a power register; and (b) replacing the contents of the power register with the contingency bit to control the supply of power to the I/O device.

In another preferred embodiment, the method of the invention includes further the steps of determining whether a power fault interrupt has occurred, detecting the presence of any unregistered I/O devices and displaying a warning message to the user. In still another preferred embodiment, the contingency bit and warning message are responsive to the detection of an unregistered I/O device.

In another embodiment, the present invention includes a system for controlling power to an I/O device attached to a GPIO, which system comprises a GPIO including a pin enable circuit having a contingency register holding a contingency bit; a power register coupled to the contingency register; and a buffer coupled to the power register and a pin on the GPIO. In a preferred embodiment, the system of the invention further includes an activatable pull up register. In another preferred embodiment, the system of the invention also includes a pin status circuit which is optionally connected to an anti-leak circuit. The anti-leak circuit preferably includes two npn or pnp transistor in series. A preferred anti-leak circuit comprises an OR gate or an AND gate. In yet another preferred embodiment, the present invention further includes means for generating a warning message, the contents of which message is related to the detection of an unregistered I/O device.

In yet another embodiment, the present invention includes a general purpose input/output (GPIO) circuit, comprising: an output pin and a pin enable circuit having an output coupled to the pin and having inputs receptive a pin enable register and a power register, the pin enable register having an input receptive to a contingency register. In a preferred embodiment, the system of the invention further includes an activatable pull up register. In another preferred embodiment, the system of the invention also includes a pin status circuit which is optionally connected to an anti-leak circuit. The anti-leak circuit preferably includes two npn or pnp transistor in series. A preferred anti-leak circuit comprises an OR gate or an AND gate. In yet another preferred embodiment, the present invention further includes means for generating a warning message, the contents of which message is related to the detection of an unregistered I/O device.

These and other aspects and advantages of the invention will become apparent when the following detailed description is read in conjunction with the accompanying figures.

BRIEF DESCRIPTION OF THE DRAWINGS

FIGS. 2A and 2B illustrate a GPIO circuit of the invention.

FIGS. 3A and 3B are illustrations of anti-leak circuitry.

DESCRIPTION OF THE PREFERRED EMBODIMENT

Figure 1:
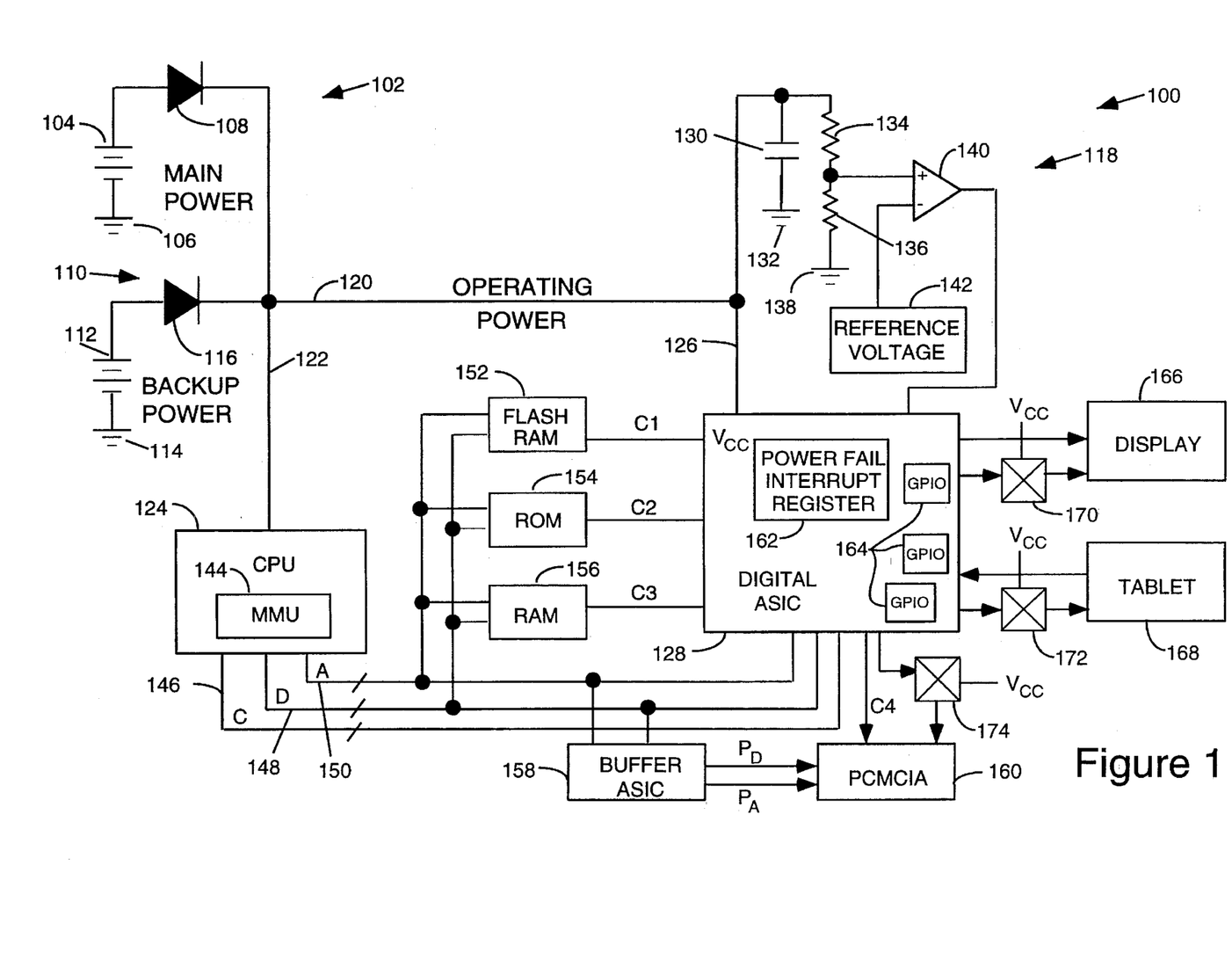
FIG. 1 is an illustration of a computer system including an ASIC and several GPIOs.

FIG. 1 provides an illustration of a computer system 100 in accordance with the present invention. System 100 includes a main power unit 102, comprising battery 104 which is connected to ground 106 and diode 108, and a backup power unit 110, which includes battery 112 connected to ground 114 and diode 116. Each power unit supplies an operating voltage $V_{CC}$ to the system. Typically, $V_{CC}$ is kept between about 3.0V and 3.5V, and preferably at about 3.3V in the case of a Newton™ PDA. The main and backup power units are connected in parallel; and both power units are connected in series with cold boot reset switch 118 to the operating power bus 120. Operating power bus 120 is available to all other system components and peripheral devices through line 122 which is connected to CPU 124, and line 126 which is connected to digital ASIC 128. The components just described are of standard design and construction and are well known to those of skill in the art.

Cold boot reset 118 comprises a capacitor 130 connected to ground 132 and to resistors 134 and 136 both of which are connected in series to form a voltage divider with ground 138 and the non-inverting input to op-amp 140. The inverting input to op-amp 140 is connected to reference voltage source 142. The output from op-amp 142 is connected to ASIC 128. These elements are described in greater detail in co-pending U.S. Patent application Ser. No. 08/315,951, filed Sep. 30, 1994, which is incorporated herein by reference.

CPU 124 preferably includes a Memory Management Unit (MMU) 144 and is connected to ASIC 128 through a control bus 146 ("C"), a data bus 148 ("D") and an address bus 150 ("A"). Address bus 150 and data bus 148 are also connected to non-volatile Random Access Memory (Flash RAM) 152, Read-Only Memory (ROM) 154 and RAM 156, each of which is connected to ASIC 128 through control busses C1, C2 and C3 respectively. CPU 124, Flash RAM 152, ROM 154 and RAM 156 are preferably commercially available integrated circuits ("chips") available from a variety of sources and are well known in the art. Typically, CPU 124 is a single chip digital processor, ROM 154 contains the basic operation system instructions for the computer system, RAM 156 is used for temporary memory and Flash RAM 152 is used for data storage during a powerdown state. In a preferred embodiment, Flash RAM 152 is a RAM having a separate dedicated battery backup. In another preferred embodiment, the temporary memory is stored as pages in RAM 156 and controlled by MMU 144. RAM 156 further includes memory validity data in the form of a successful store register, the memory validity data indicative of the validity of the permanent memory stored therein. Data and address busses 148 and 150 are also connected to buffer ASIC 158 which is connected to PCMCIA card 160 by data and address busses labeled $P_D$ and $P_A$ respectively.

ASIC 128 preferably includes Power Fail Interrupt Register (PFIR) 162 and a plurality of input/output (I/O) circuits shown generally at 164. In a preferred embodiment, the I/O circuits are general purpose input/output (GPIO) circuits. ASIC 128 is also connected to Display 166, Tablet 168 and PCMCIA 160 through power controls 170, 172 and 174 respectively. The GPIOs will be discussed in greater detail below. ASIC 128 including the PFIR 162, Display 166, Tablet 168 and power controls 170, 172 and 174 are of standard construction and design and are well known to those of skill in the art.

Figure 2A:
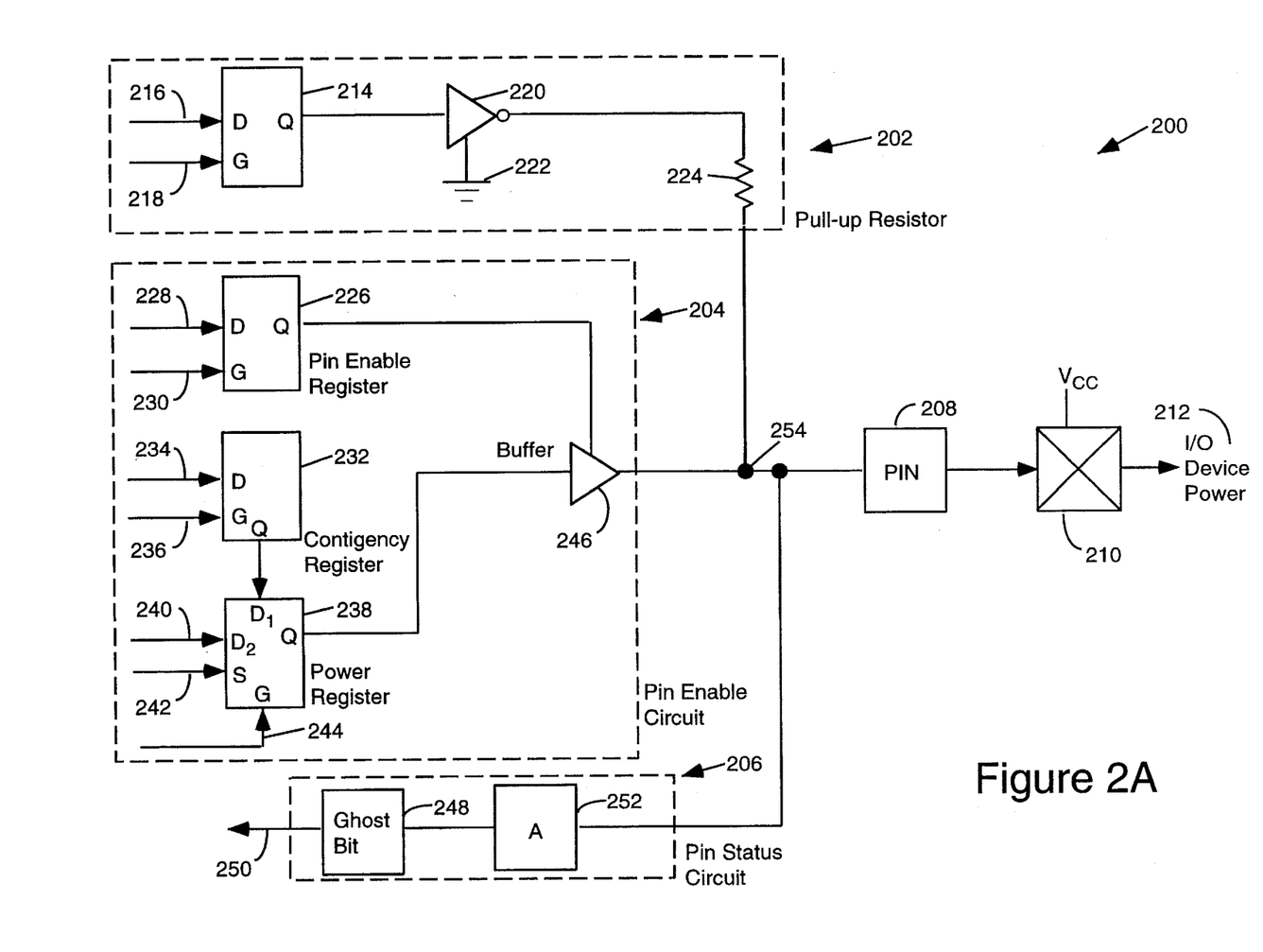
FIG. 2A illustrates a GPIO in accordance with the present invention.

FIG. 2A at 200 illustrates one type of I/O circuit of the invention, a GPIO, which I/O circuit is shown generally at 164 in FIG. 1. In a preferred embodiment, GPIO 200 includes an activatable pull-up resistor 202, a pin enable 204 and a pin status circuit 206. Activatable pull-up resistor 202, pin enable 204 and pin status circuit 206 are connected in parallel to pin 208, which pin is connected to a power control 210 which in turn in connected to an I/O device 212 such as a PCMCIA card. As will be explained in greater detail below, the GPIO of the invention is capable of shutting off power selectively to the I/O device to which the GPIO is attached in response to a system powerdown, such as when an attached device draws an amount of current sufficient to cause a system powerdown. Optionally, the GPIO of the invention includes anti-leak circuitry to minimize current leakage through the GPIO.

Activatable pull-up resistor 202 comprises a register 214, which register receives data over data line 216 and a gate signal over gate line 218. Register 214 is connected to a buffer 220, which buffer is connected to a ground 222 and a and a resistor 224. Register 214 can be any device capable of storing at least one bit and is well known to those of skill in the art. Preferably register 214 is a transparent latch. Data line 216 and gate line 218 both supply signals to the input (D) and gate (G) of register 214 respectively in response to software and/or operating system instructions and are of known design and construction. Typically, gate line 218 carries signals from the address decoder resident on the ASIC. Buffer 220 is also well known in the art and can be any device used to isolate register 214 from the load created by the remainder of the GPIO circuit. Preferably, buffer 220 is a inverted CMOS buffer (such as shown at 220 in FIG. 2A). Buffer 220 can also be a non-inverted buffer, which may comprise two inverted buffers. Resistor 224 can be any device having a high resistance or impedance. Preferably, resistor 224 has a resistance of between about 1 and about 10 megohms (MΩ) and more preferably between about 5 and about 10 MΩ. In a preferred embodiment, resistor 224 is a p-channel field effect transistor (p-channel FET) which is "tied-off", i.e., is kept in an active state. Other equivalent devices will be well known to those of skill in the art.

Pull-up resistor 202 is designed to be activatable in response to commands generated by software and/or the operating system to prevent current leakage in situations where an I/O device is not attached to the GPIO. It will be appreciated by those of skill in the art that when pin 208 is not connected to an I/O device, the voltage at node 254 would be in an undesirable "floating" state in the absence of pull-up resistor 202 and the circuit would be vulnerable to leakage of current. However, when an I/O device is connected the GPIO, node 254 has a non-floating voltage and the effect of the pull-up resistor is not required.

Thus, input D of register 214 stores a bit of information generated by software which bit determines whether buffer 220 is in an "on" state or an "off" state. When gate G of register 214 is placed in an active state (typically high) by the address decoder, the contents of D are transferred to output Q which is seen by buffer 220. In a preferred embodiment, placing D in a high state allows current to flow through buffer 220 when the gate is activated and the contents of D are transferred to output Q. While the gate is in an active state, the value of D may be changed from high to low, thus allowing the software to control pull-up resistor 202 in response to various GPIO conditions, such as the insertion and removal of a PCMCIA card. When the gate is in a low ("off") state, Q retains the last value of D, allowing pull-up resistor 202 to be left in a desired state indefinitely.

Pin enable 204 comprises enable register 226 which register includes attached data line 228, supplying a signal to input D of register 226, and a gate line 230 which supplies a signal to gate G of register 226. Pin enable 204 also includes register 232 with its associated data and gate lines 234 and 236, respectively. The output (Q) of register 232 (also referred to herein as the "contingency bit") is connected to the first data input ($D_1$) of two-input latch 238. Latch 238 (also referred to herein as the "power register") includes data, status and gate lines 240, 242 and 244 which are connected to the second data input ($D_2$), status (S) and gate (G) of register 238 respectively. The outputs (Q) from register 226 and register 238 are connected to buffer 246 which acts to supply current to pin 208 in a controlled fashion as will be described below. Registers 226 and 232, and their associated data and gate lines are substantially as described above with respect to register 214 and lines 216 and 218. Two-input latch 238 and its associated connections are well known to those of skill in the art.

Register 226 acts as a "direction selector" for buffer 246 in response to software and/or operating system commands. When input D of register 226 is active (typically high) buffer 246 is enabled and will allow current to flow to pin 208. When D is not active (low) buffer 246 is disabled and current will flow from pin 208 through pin status circuit 206. Register 238 controls the status of pin 208. It will be appreciated that the state of S determines which input ($D_1$ or $D_2$) is passed to output Q and hence to buffer 246. If S is in an active state (typically high) and the gate is also active, the contents of $D_2$ will be transferred to output Q and will be seen by buffer 246. If S is inactive (low) and the gate is active, the contents of $D_1$ will be transferred to Q and to buffer 246. Register 232 acts as a "contingency register" for register 238. In a preferred embodiment, the data input (D) of register 232 (referred to herein as the "contingency bit") is set by software to a predetermined state such that buffer 246 will either continue to supply power to pin 208 or cease to supply power to pin 208 if a system powerdown occurs.

Whether the contingency bit is set to active or inactive depends on whether that device is considered to have priority sufficiently high to allow the system to supply power to the device following a powerdown, and whether the device attached to pin 208 is a recognized or unrecognized I/O device. Generally, unrecognized devices will not receive power after a power fail interrupt, as those devices are the likely cause of the interrupt by demanding more current than the system can provide. However, a recognized device may also be denied power during a powerdown if maintaining the continued function of the device is not a critical consideration to the user. For example, a modem PCMCIA card may be turned off during a powerdown as its function can generally be terminated for extended periods. Some devices will remain powered as the user generally will not want to terminate their function, e.g., modem PCMCIA cards which are receiving data continuously, such as paging devices.

It will be appreciated that a variety of techniques can be employed for determining which devices remain powered an which are allowed to be turned off. For example, the user can control the priority of the attached I/O devices using software to set the data inputs of register 232 for each device. Alternatively, software could identify each I/O device upon receiving an interrupt and registration and assign a value for the data input of register 232 for each device automatically based on defaults which the user has determined previously. Other methods will be apparent to those of skill in the art.

Figure 2B:
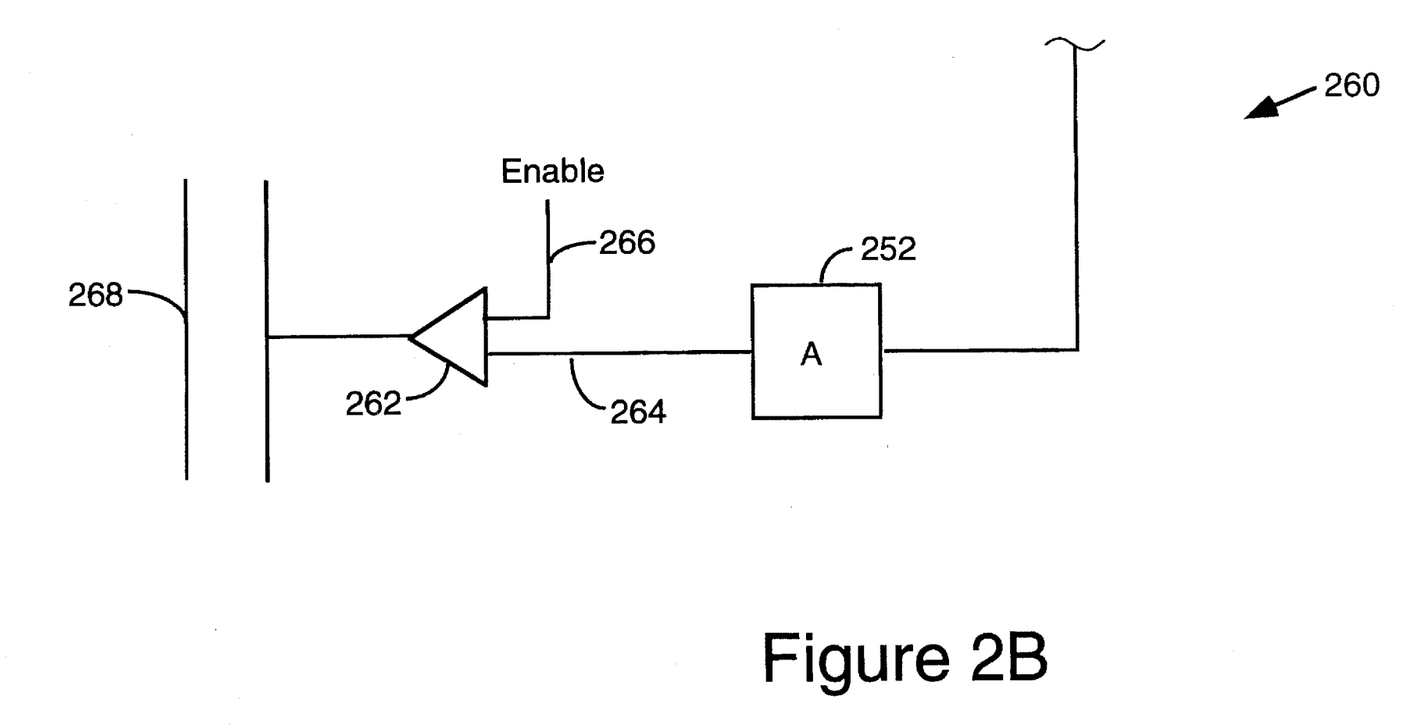
FIG. 2B is a detail of a ghost bit on the GPIO.

Pin status circuit 206 includes a virtual register ("Ghost Bit") 248 connected to the data bus of the system (not shown) by a connection shown generally at 250. Optionally register 248 is connected to anti-leak circuit 252 ("A"). In a preferred embodiment, virtual register 248 is not a storage unit, such as a latch; rather, virtual register 248 is a addressed device which reflects the state of pin 208 and which can be read selectively by an appropriate signal from the operating system and/or software. Thus, virtual register 248 appears as a bit in a register to the software and/or operating system. One example of such an embodiment is illustrated at 260 in FIG. 2B. There, a buffer 262 is connected to pin 208 (not shown) by line 264 and to an enable connection 266 which connects register 248 to a register on the ASIC. Upon receiving a enable signal from the address decoder, a signal from buffer 262 is put on to the system data bus 268 where it can be stored in a register and accessed by software.

Anti-leak circuitry 252 comprises generally a "switch" which can allow current to flow through virtual register 248 in response to commands from the operating system and/or software. In a preferred embodiment, anti-leak circuitry 252 comprises two n-channel and/or two p-channel transistors in series. For example, anti-leak circuitry 240 may comprise an "or", "inverse or" (NOR), "and" or an "inverse and" (NAND) gate. Such gates can be constructed and operated using materials and techniques well known in the art.

Figure 3A:
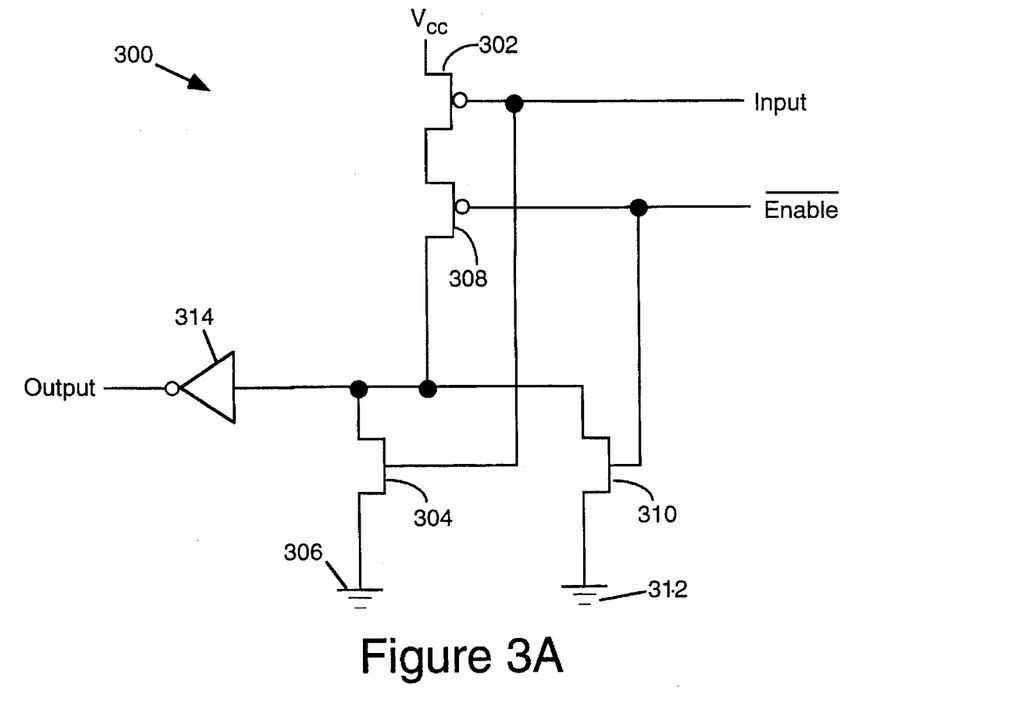
FIG. 3A illustrates a "enable-low" circuit.
Figure 3B:
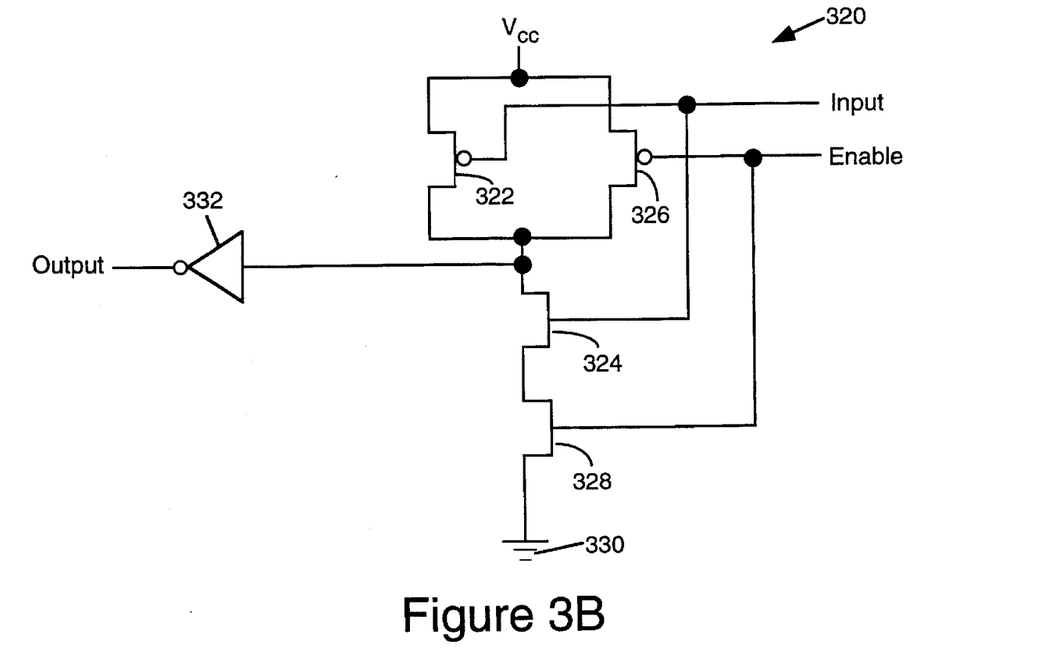
FIG. 3B illustrates an "enable-high" circuit.

FIGS. 3A and 3B illustrate two preferred anti-leak circuits. FIG. 3A illustrates an "enable-low" circuit in which an input line is connected to inverted transistor 302 and transistor 304. Transistor 304 is connected in turn to ground 306. Similarly, an enable line is connected to inverted transistor 308 and transistor 310 which is connected to ground 312. Transistors 302 and 308 are connected in series as described above. Such a circuit will only allow output current to pass inverted buffer 314 when the enable is low. FIG. 3B illustrates a second preferred "enable-high" anti-leak circuit at 320. There, an input line is connected to inverted transistor 322 and transistor 324. Similarly, an enable line is connected to inverted transistor 326 and transistor 328. Transistor 328 is connected to ground 330. Transistors 324 and 328 are connected in series as described above. Such a circuit will only allow output current to pass inverted buffer 332 when the enable is high. In each of FIGS. 3A and 3B, the input comprises current flowing from pin 208 and the enable comprises a signal sent from a register on the ASIC. The output signal is received by virtual register 248. Other equivalent embodiments will be apparent to those of skill in the art.

Figure 4:
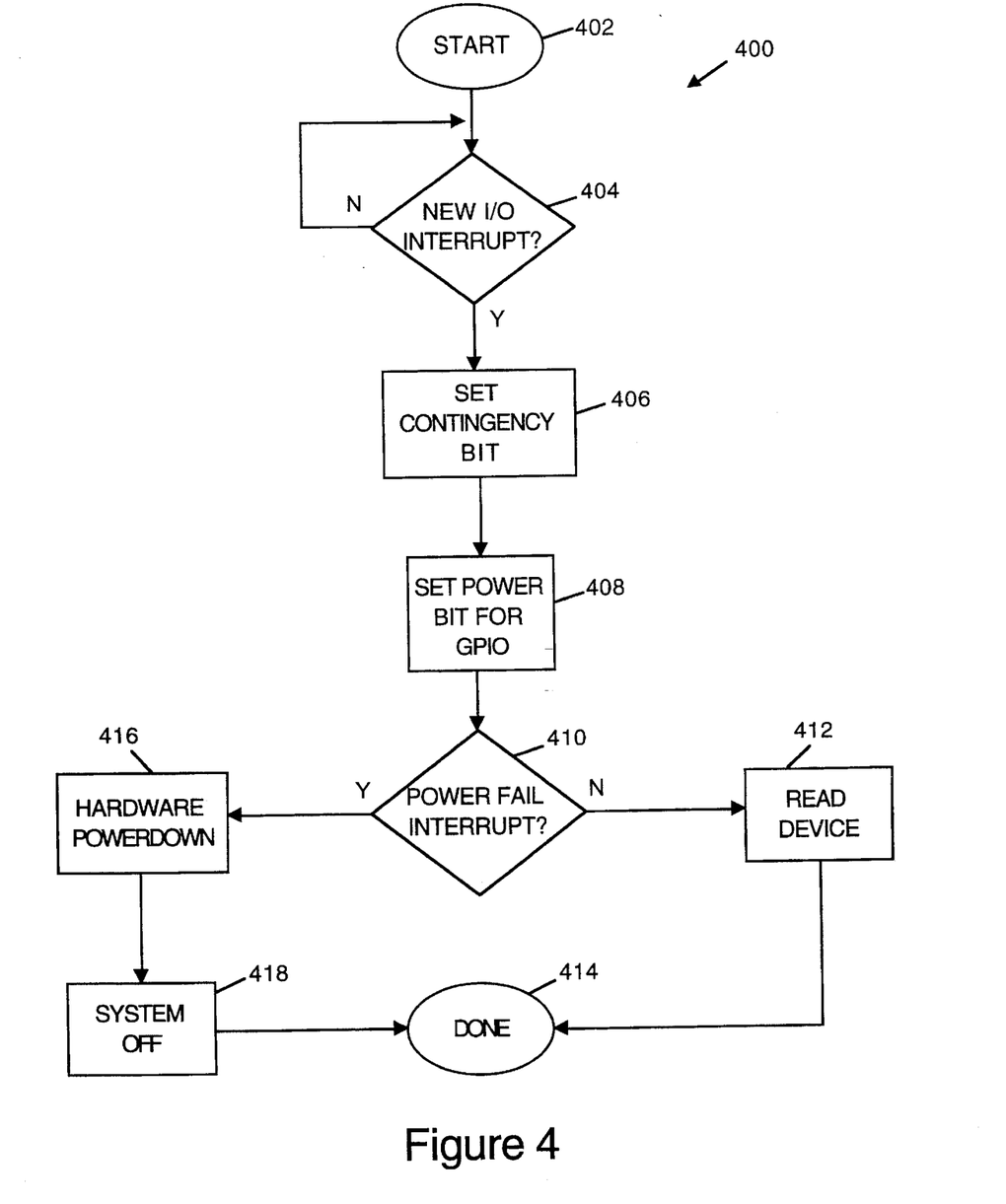
FIG. 4 is a flow diagram illustrating anticipatory power management.

Turning now to FIG. 4, a method for controlling the power supply to an I/O device connected to GPIO is described at 400. Generally, if no I/O device is attached to the GPIO at step 402 pull-up resistor 202 is in an activated state to prevent current leakage from pin 208 through virtual register 248. Pin enable circuit 204 is in a deactivated state as no current is required to flow through pin 208. Upon attachment of an I/O device, an I/O interrupt is processed by the system at 404. Generally, pull-up resistor 202 is deactivated by sending a low bit to the data input of register 214 and activating the gate to output a low signal to buffer 220. At step 406, the contingency bit of register 232 is set to a value determined by the system to be appropriate for the I/O device attached to the GPIO. At step 408 the data bit D and power bit $D_1$ of registers 226 and 238 are set high, and their gates activated, to enable current to pass from buffer 246 to pin 208.

If the inserted I/O device does not cause a power fail interrupt, power is supplied as required by setting appropriate values for the power bit in register 238 and enable register 226. The state of pin 208 can be determined by sending enable signals to the ghost bit 248 and, if necessary, anti-leak circuit 252. The device is read at step 412 and execution terminates at step 414. However, if a power fail interrupt is received by the system, a hardware powerdown is initiated as described in co-pending U.S. Patent application Ser. No. 08/315,951 filed Sep. 30, 1994 and incorporated herein by reference. Upon loss of power, S in register 238 goes low, but the gate in the contingency register remains high; thereby allowing the contingency bit to be passed from the contingency register to the power register in data input $D_2$. If the device is to remain powered, the contingency bit will generally be high; if the device is not to remain powered the bit will be low. The system is then shut down at step 418 to await restart and the program execution terminates at step 414.

Figure 5A:
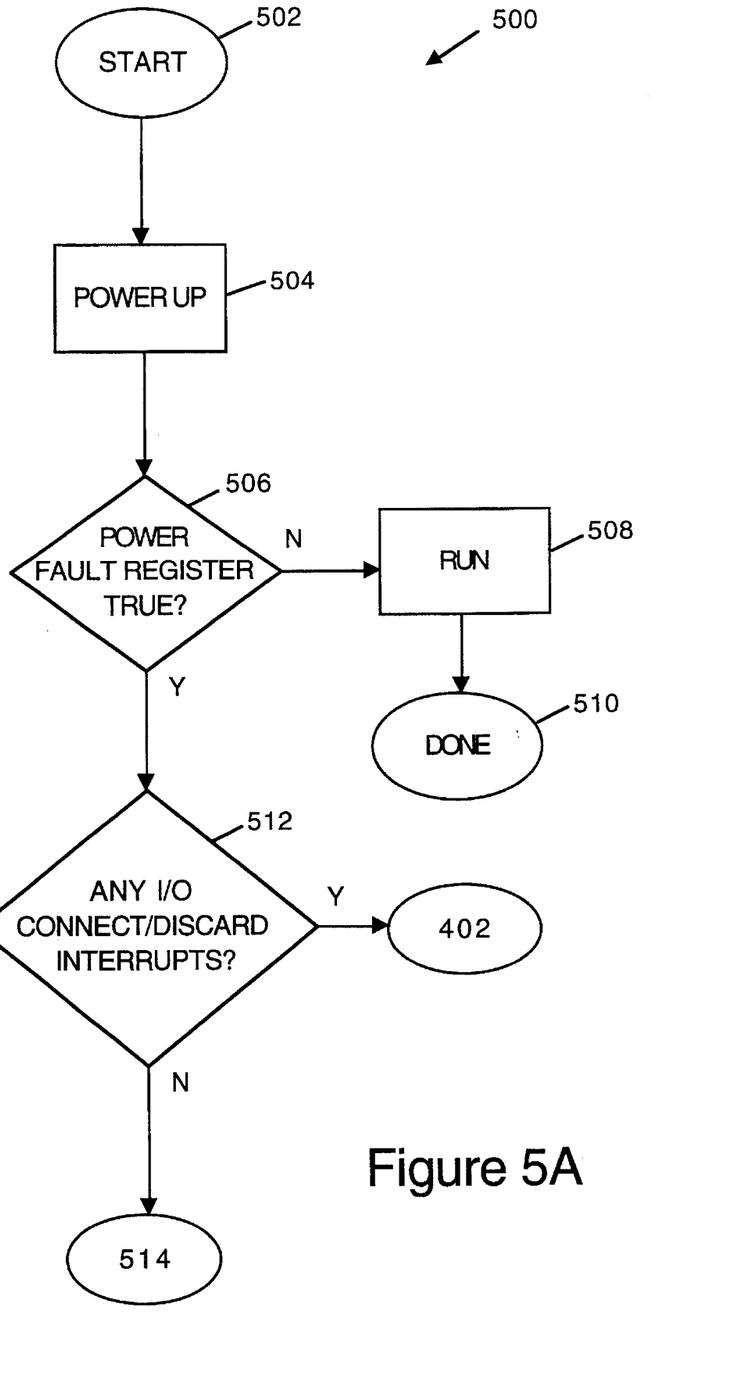
FIGS. 5A and 5B are flow diagrams illustrating intelligent system restart after an unexpected powerdown.
Figure 5B:
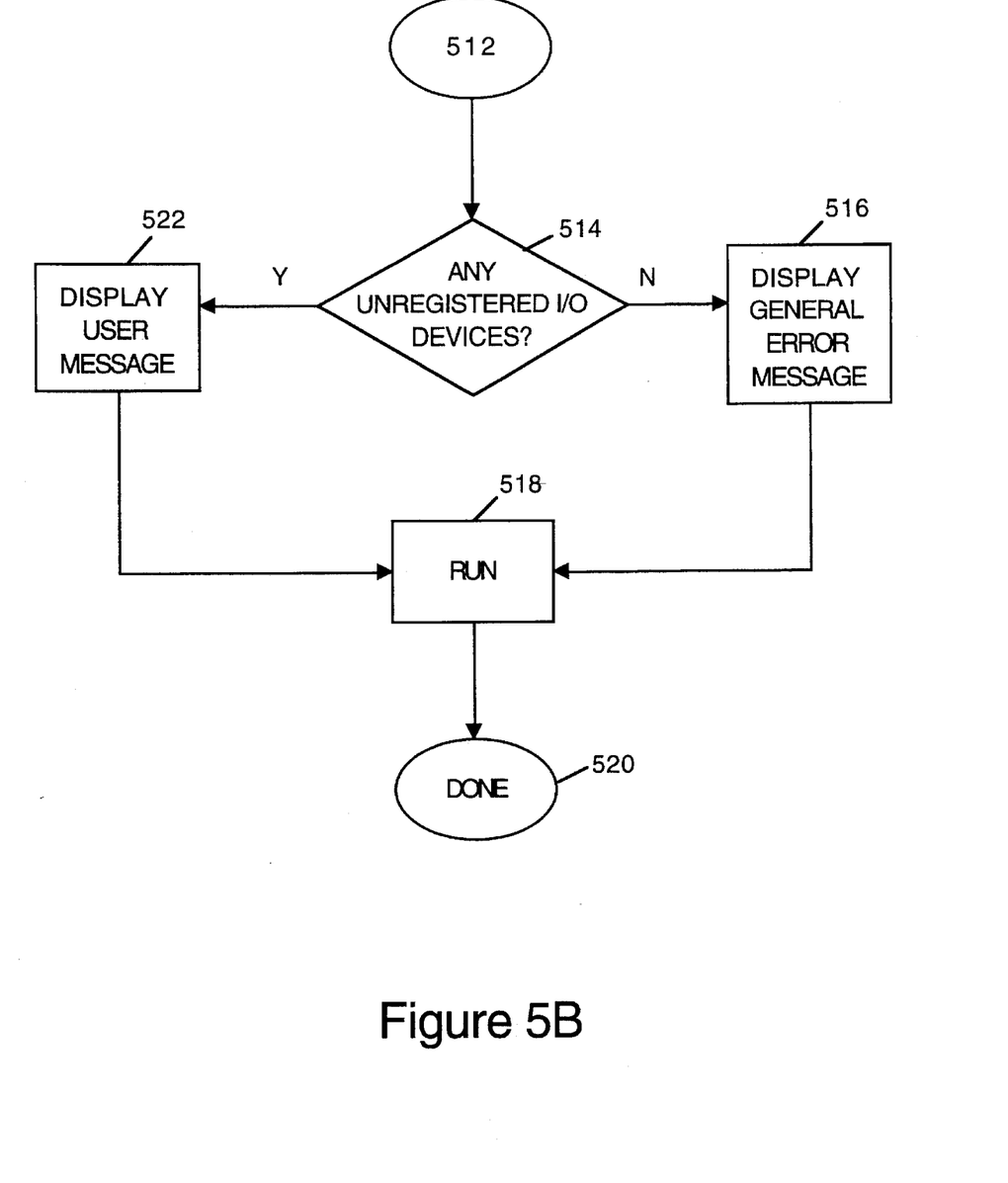

FIGS. 5A and 5B illustrate the restarting of the system at step 500. Beginning with the initialization step 502, upon power up at step 504 (described in co-pending U.S. Patent application Ser. No. 08/315,951, the power fault register is examined at step 506 to determine whether or not a power fault has occurred (i.e., whether the power fault register is in a "true" state). If the power fault register is not true, then, at step 508, execution of the system begins and the program terminates at step 510. If the power fault register is true, however, then, at step 512, the system is polled to determine whether any I/O connect/discard interrupts were recorded by the system. If a connect/discard was recorded, control reverts back to step 402 as described in FIG. 4.

If no connect/discard interrupt was recorded, then, at step 514, a determination b 55997662.001 is made as to whether any unregistered I/O devices are present. If no such devices are present, a general error message is displayed at step 516, the system begins execution at step 518 and the program terminates at step 520. Such a general error message can be any message of the type that warns the user of the occurrence of a nondescript error in the system such as, for example, "battery power is low, please check batteries." Other types of general error messages will be apparent to those of skill in the art. If, however, an unregistered I/O device is detected, then, at step 522, a specific user message is displayed, preferably to indicate to the user that the unregistered device likely caused the error state and powerdown by drawing too much current from the system, and that the device has been turned off and should be removed. Thus, for example, a statement might indicate to the user "PCMCIA card in slot number 2 cannot be activated due to insufficient power." The error message might also indicate to the user possible avenues for rectifying the error situation. Again, those of skill in the art will recognize that a variety of messages may be displayed to the user which convey the appropriate information. In addition, the value of $D_1$ will be set to disable buffer 246 from allowing current to flow to pin 208; thereby shutting off power to the I/O device.

The advantages of the invention will now be apparent. Using the method, and system of the invention, power loss can be reduced in low power computing devices such as PDAs to thereby afford users a greater range of use for these devices.

Although certain embodiments and examples have been provided for the purpose of describing the invention, it will be apparent to those of skill in the art that changes may be made to those embodiments and/or examples without departing from the scope and character of the invention.

What is claimed:

1. A method for controlling the supply of power to an I/O device attached to an I/O circuit in a computer apparatus, comprising the steps of:

a) providing an I/O circuit including a pin enable circuit coupled to an I/O device power pin, said pin enable circuit comprising a contingency register holding a contingency bit and a power register which controls said power supply to said I/O device power pin, wherein said contingency bit is reflective of a power supply priority of an I/O device incapable of power consumption management, said I/O device being powered by said I/O device power pin such that an unrecognized I/O device receives low priority; and b) replacing the contents of said power register with said contingency bit in response to an unanticipated system powerdown condition to control the power supply to the I/O device during said unanticipated system powerdown condition based upon said power supply priority indicated by said contingency bit.

2. The method of claim 1, further comprising the step of detecting an unregistered I/O device and providing a user warning.

3. The method of claim 1, wherein said contingency bit is set in response to the detection of a new I/O interrupt.

4. The method of claim 1 further including the step of initiating a hardware powerdown after replacing the contents of said power register.

5. The method of claim 4, wherein said computer apparatus is turned off after said hardware power down.

6. The method of claim 4, further comprising the steps of:

a) determining whether a power fault interrupt occurred;

b) detecting the presence of any unregistered I/O devices; and c) displaying a warning message.

7. The method of claim 6, wherein the content of said warning message is related to the presence of an unregistered I/O device.

8. A method for controlling the supply of power to an I/O device attached to a General Purpose Input/Output (GPIO) of a computing device, comprising the steps of:

a) providing a GPIO including a pin enable circuit coupled to an I/O device power pin, said pin enable circuit comprising a contingency register holding a contingency bit and a power register which controls said power supply to said I/O device power pin, where said contingency bit is reflective of a power supply priority of an I/O device incapable of power consumption management, said I/O device being powered by said I/O device power pin;

b) detecting a power fail interrupt;

c) replacing the contents of said power register with said contingency bit in response to an unanticipated system powerdown condition to control the power supply to said I/O device during said unanticipated system powerdown condition such that an unrecognized I/O device receives low power supply priority;

d) determining whether a power fault interrupt occurred upon restarting said computing device;

e) detecting the presence of any unregistered I/O devices; and f) displaying a warning message.

9. A system for controlling the supply of power to an I/O device attached to a General Purpose Input/Output (GPIO), comprising a GPIO including a pin enable circuit coupled to an I/O device power pin comprising:

a) a contingency register holding a contingency bit;

b) a power register which controls said power supply to said I/O device power pin, where said contingency bit is reflective of a power supply priority of a I/O device powered by said I/O device power pin, such that said power register is coupled to said contingency register; and c) a buffer coupled to said power register, said buffer further coupled to a pin on said GPIO wherein said contingency bit is transferred to said power register upon the occurrence of an unanticipated powerdown to control thereby the flow of power through said buffer to said pin during said unanticipated powerdown such that an unrecognized I/O device receives low power supply priority.

10. The system of claim 9, further comprising an activatable pull up resistor coupled to maintain said pin at a fixed state when said activatable pull up resistor is in an enabled state.

11. The system of claim 9, further comprising a pin status circuit coupled to said pin, said pin status circuit comprising a virtual register which reflects the state of a signal at said pin.

12. The system of claim 11, wherein said pin status circuit comprises an anti-leak circuit coupled to said virtual register to prevent current flow through said virtual register when said anti-leak circuit is in a disabled state.

13. The system of claim 12, wherein said anti-leak circuit comprises two n-channel or two p-channel transistors coupled in series.

14. The system of claim 13, wherein said anti-leak circuit is selected from the group consisting of an OR gate and an AND gate.

15. The system of claim 11, wherein said virtual register comprises a buffer connected to a data bus.

16. The system of claim 15, wherein said buffer is coupled to an anti-leak circuit to prevent current flow through said buffer when said anti-leak circuit is in a disabled state.

17. The system of claim 16, wherein said anti-leak circuit comprises two n-channel or two p-channel transistors coupled in series.

18. The system of claim 17, wherein said anti-leak circuit is selected from the group consisting of an OR gate and an AND gate.

19. The system of claim 18, further comprising means for generating a warning message, wherein the content of said warning message is related to the presence of an unregistered I/O device.

20. A general purpose input/output (GPIO) circuit, comprising:

a) a pin coupled with a buffer; and b) a pin enable circuit coupled to an I/O device power pin, said pin enable circuit having an output coupled to said pin and having inputs receptive to a pin enable register and a power register, said power register having an input receptive to a contingency register holding a contingency bit, which power register controls the supply of power to said I/O device power pin, where said contingency bit is reflective of a power supply priority of a I/O device powered by said I/O device power pin, and wherein said contingency bit is transferred to said power register upon the occurrence of an unanticipated powerdown to control thereby the flow of power through said buffer to said pin during said unanticipated powerdown such that an unrecognized I/O device receives low power supply priority.

21. The GPIO of claim 20, further comprising an activatable pull up resistor coupled to maintain said pin at a fixed state when said activatable pull up resistor is in an enabled state.

22. The GPIO of claim 20, further comprising a pin status circuit coupled to said pin, said pin status circuit comprising a virtual register which reflects the state of a signal at said pin.

23. The system of claim 22, wherein said pin status circuit comprises an anti-leak circuit coupled to said virtual register to prevent current flow through said virtual register when said anti-leak circuit is in a disabled state.

24. The system of claim 23, wherein said anti-leak circuit comprises two n-channel or two p-channel transistors coupled in series.

25. The system of claim 24, wherein said anti-leak circuit is selected from the group consisting of an OR gate and an AND gate.

26. The system of claim 22, wherein said virtual register comprises a buffer connected to a data bus.

27. The system of claim 26, wherein said buffer is coupled to an anti-leak circuit to prevent current flow through said buffer when said anti-leak circuit is in a disabled state.

28. The system of claim 27, wherein said anti-leak circuit comprises two n-channel or two p-channel transistors coupled in series.

29. The system of claim 28, wherein said anti-leak circuit is selected from the group consisting of an OR gate and an AND gate.

30. The system of claim 22, further comprising means for generating a warning message, wherein the content of said warning message is related to the presence of an unregistered FO device.

31. A method of controlling the supply of power to an I/O device attached to a GPIO unanticipated system powerdown, comprising the steps of:

a) detecting an I/O interrupt;

b) setting a contingency bit in a contingency register in said GPIO circuit;

c) setting a power bit in a power register which controls said power supply to said I/O device power pin, where said contingency bit assigns a low power supply priority to an unrecognized I/O device powered by said I/O device power pin in said GPIO circuit to enable said GPIO to provide power to said I/O device;

d) detecting a power fail interrupt; and e) replacing the contents of said power register with said contingency bit in response to an unanticipated system powerdown condition to set said GPIO to a predetermined state upon power up.

* * * * *